July 29, 1969 A. J. SCHWEMIN 3,457,646
LASER BEAM OPERATED X-Y TABLE
Filed Aug. 29, 1966 2 Sheets-Sheet 1

INVENTOR.
ARNOLD J. SCHWEMIN
BY
ATTORNEY.

July 29, 1969        A. J. SCHWEMIN        3,457,646

LASER BEAM OPERATED X-Y TABLE

Filed Aug. 29, 1966        2 Sheets-Sheet 2

INVENTOR.
ARNOLD J. SCHWEMIN
BY
ATTORNEY.

3,457,646
LASER BEAM OPERATED X-Y TABLE
Arnold J. Schwemin, Oakland, Calif., assignor to the United States of America as represented by the United States Atomic Energy Commission
Filed Aug. 29, 1966, Ser. No. 576,196
Int. Cl. G01b *15/00;* G01c *15/02, 15/12*
U.S. Cl. 33—1                                     5 Claims

ABSTRACT OF THE DISCLOSURE

An automatic measuring table in which a laser beam is swept 360° in a plane just above and parallel to a measuring surface for activating a photocell that may be manually positioned on the surface at a point to be measured. Two additional sweeps are provided by two flat mirrors mounted on the table for reflecting the beam to sweep the plane. Three indexing photocells are permanently mounted on the table to detect the beginning of respective sweeps for triggering associated counters that are stopped by an output from the manually positioned photocell. The content of the counters defines the point.

---

The present invention relates generally to measuring tables and more particularly to apparatus suitable for automatically defining the relative position of various points in a graphical display. The development of the subject invention was done in the course of, or under, Contract W-7405-eng-48 with the United States Atomic Energy Commission.

Automatic measuring systems wherein the location of points on a graphic line display are measured and recorded generally must use some form of tracing, or tracking, along the lines of interest. This is often done with an optical reticule having crosshairs to be visually centered on the line whereupon the tracking its accomplished by providing some form of relative motion between the reticular centering reference and the graphic display being measured. The measurement is then obtained by recording the relative motion between the reference and the display.

In the past, various degrees of refinement have been introduced into these systems, such as using differential light response to drive servo motors for automatic centering of the reticule on the line, along with simplifications in the guiding techniques for the necessarily two-directional tracking motion. The need for the tracking motion, however, basically limits the simplicity of these devices as the mechanical translation must be conveyed to the motor drive by some form of rails and ways, or rails and carriages, pulleys, or worm gears. In addition, the inherent difficulty of accurately recording the travel of these mechanical conveyances limits the degree of accuracy which can be achieved with the system.

The subject invention eliminates both of these restrictions of the conventional measuring techniques by providing a system requiring no mechanical tracking. The invention uses a laser source mounted in a rotatable periscope to sweep a highly collimated light beam in a horizontal plane just above the surface of the measuring table. Two elongated mirrors are strategically mounted along each side of the periscope to provide three separate sweeps of the beam over the measuring area or region for each revolution of the periscope. A movable probe having a photosensitive device at the tip is placed at the point on the table to be measured and intercepts the light beam in each of its three sweeps. The probe output triggers counting circuitry to record the instantaneous angular position of the periscope at the time of the interceptions.

From the geometry of the optics involved, the angular position of the light beam at two of the interceptions will determine the location of the probe on the table. The third measurement is redundant but provides an automatic check for error.

The fine collimation of the light beam and the high precision which is readily available in disc encoders for registering rotational positions lend the device a high degree of accuracy. The ease and simplicity of the measuring opueration are obvious advantages for all measuring situations, but make the device particularly attractive in applications such as automatic map reading and as a guiding system for computerized drafting techniques.

Accordingly, it is an object of the invention to provide a highly accurate means for automatically determining the coordinate locations of points on reference surface.

It is yet another object of the invention to provide a coordinate measuring table which is quickly and easily operated.

It is a further object of the invention to provide a measuring device which is adaptable to the guidance of automatic drafting techniques.

The invention, both as to its organization and method of operation, together with further objects and advantages thereof, will be best understood with reference to the following specification taken in conjunction with the accompanying drawing of which:

Figure 1:
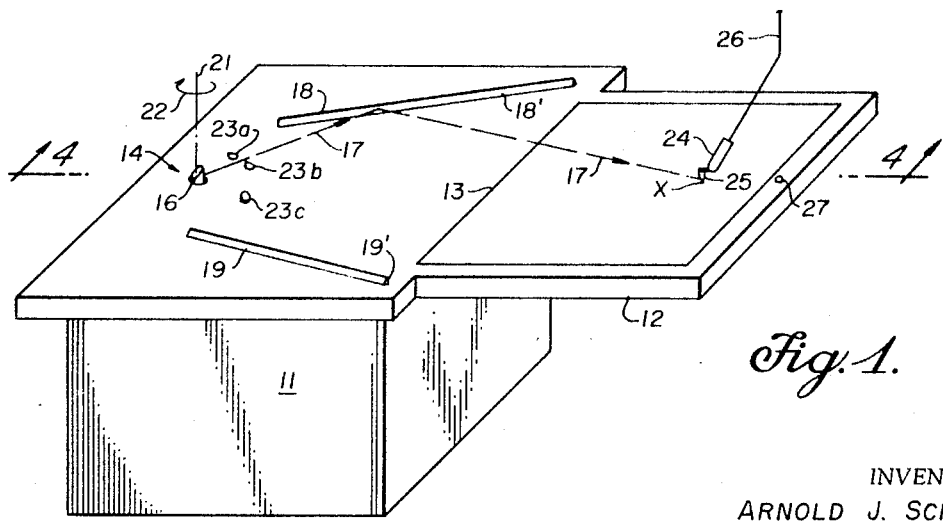
FIGURE 1 is a perspective view of the measuring table of the invention.

Referring now to the drawing and more particularly to FIGURE 1 thereof, there is shown a measuring table 11. The measurements are made in the horizontal plane of the table top 12 which is provided with a smooth even surface therefor and the measuring area of which is indicated thereon by the square outline 13 on the forward cantilevered section thereof. A rotatable periscope 14 containing a laser light source (not shown in FIGURE 1) is centered along the rear edge of the table 11 and mounted beneath the table top 12. The periscope 14 extends up through the table top 12 whereby the periscope head 16 projects a highly collimated light beam 17 from the laser outward therefrom in a horizontal plane which is slightly above the surface of the table top. A pair of long slender flat mirrors 18 and 19 are spaced apart and mounted on the rearward portion of the table top 12 with the mirrored surfaces 18' and 19' thereof normal to table top 12. The mirrors 18 and 19 are symmetrically arranged with respect to the rotational axis 21 of the periscope 14 in such a way that throughout certain sectors of the periscope rotation (indicated by the arrow 22) the light beam 17 is reflected back over the measuring area 13 of the table 11.

Figure 2A:
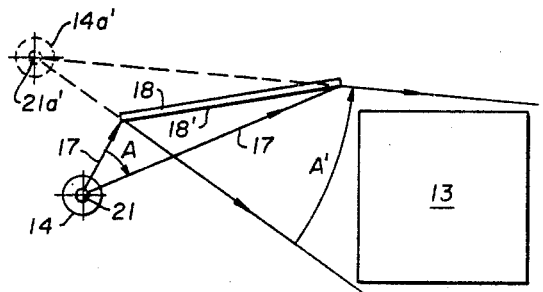
FIGURES 2a, 2b and 2c are schematic diagrams of the optical geometry utilized in the apparatus of FIGURE 1.

The arrangement of the periscope 14 and mirrors 18 and 19 and the optical geometry thereof which defines the measuring area 13 will best be understood with reference to the schematic diagrams of FIGURE 2. In FIGURE 2a a first sector A of the periscope 14 rotation is considered, within which sector the laser beam 17 is reflected from the first mirror 18. It can be seen that as the beam 17 strikes the edge of mirror surface 18' nearest the periscope 14 it is deflected from that point toward a corner of the measuring area 13. Continued rotation of the periscope 14 sweeps the beam 17 along the length of the mirror 18 and sweeps the reflected beam across the measuring area 13 until, at the far edge of the mirror 18, the reflected beam is swept beyond the diagonal corner of the measuring area.

Figure 2B:
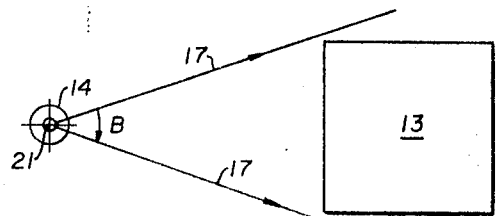

In FIGURE 2b it can be seen that continued rotation of the periscope 14 will sweep the beam 17 through a second sector B of rotation in which the beam will sweep directly across the measuring area, the sector B being defined by the adjacent corners of the area 13 nearest the periscope.

Figure 2C:
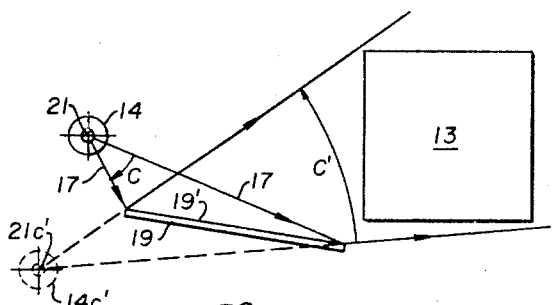

Upon further rotation of the periscope 14, as can be seen in FIGURE 2c, the beam 17 first strikes the far edge of second mirror 19 and the reflected beam therefrom is swept back over the measuring area 13 throughout this sector C until the periscope has turned beyond the nearest edge of the mirror surface 19'.

From the virtual images formed by mirrors 18 and 19, the two reflected sweep sectors A' and C' can be assumed to originate from their respective virtual image positions of the periscope (shown in phantom in FIGURES 2a and 2c and indicated by primes) with the rotational direction of the two sweeps A' and C' being opposite to the rotational direction of the real periscope 14 and of the direct sweep sector B. Knowing the locations of the mirror 18 and 19 on the measuring table 11 makes the locations of the respective virtual images of the periscope axes 21a' and 21c' also known, which positions 21a' and 21c' can thus be used as two additional originating positions of the light beam 17. The origin reference angles of the three sweep sectors A, B and C are also known by the corresponding rotational positions of the real periscope 14. Accordingly, a geometric axiom which states that "given two angles subtended from two known positions, a third position can be determined" can be applied to locate the position of any point in the measuring area 13. Any point on the measuring area 13 will always be included in each of the three sweep sectors A, B and C. Thus, the instantaneous laser beam 17 position which intercepts the unknown point within any two of the sweep sectors will define the needed subtended angles relative to their respective sector origins.

Returning now to FIGURE 1, three small photodetectors 23a, b and c are shown mounted in the table top 12 and projecting far enough thereabove to be in the plane of the laser beam 17 sweep. The detectors are disposed radially outward from the periscope 14 with a first detector 23a thereof along a line connecting the periscope axis 21 with the near end of mirror 18, which position defines the origin reference angle of sweep sector A. The second detector 23b is disposed along a line connecting axis 21 with the leading near corner of the measuring area 13 and defines the reference position of the periscope sweep sector B. Detector 23c is, accordingly, disposed along the line connecting the far end of second mirror 19 with axis 21, indicating the origin of sweep sector C. The outputs of the three photodetectors 23 provide a "start count" signal to the counting circuitry associated with the periscope 14 rotation, as will hereinafter be more fully described.

Figure 3:
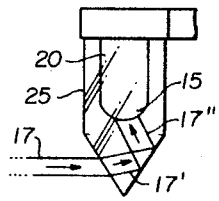
FIGURE 3 is an enlarged view of an element of FIGURE 1.

A hand-operated movable probe 24 is provided at the measuring table 11. The probe 24 has a photodetecting tip 25 therein, the output 26 of which provides a "stop count" signal to the aforementioned counting circuitry. An enlarged view of the probe tip 25 is shown in FIGURE 3. The tip 25 is made of a clear acrylic resin plastic such as the commercially available Plexiglas material (index of refraction $n \simeq 1.50$) and is tapered to a half-angle of 35° to optimize the gathering of the incoming horizontal laser beam 17. The refracted beam 17' is thereby directed for total internal reflection, and the totally reflected beam 17" is directed toward the photocathode 15 of photodetecting cell 20 disposed therein. The critical angle for the total reflection is approximately 14° from the vertical, which allows about 14° leeway in the vertical positioning and more than accommodates for the possible tilt arising from hand positioning of the probe 24.

Thus, to determine the position of a point on the measuring area 13, the operator places the probe tip 25 on the point in question and depresses a read button 27 provided along the side of the table top 12. The read button 27 acts to initiate the counting circuitry for the three sweep sectors A, B and C. As the rotating laser beam 17 sweeps across the first photodetector 23a, a first scaler count is started and continued while the beam 17 travels along the first mirror 18 and the reflected beam therefrom sweeps across the measuring area 13. At the point X where the reflected beam 17 intercepts the photodetector tip 25 of probe 24 the counting is stopped by the probe output 26 signal. The periscope 14 rotation will then proceed uncounted until the beam 17 strikes second photodetector 23b indicating a "start count" for sweep sector B. At the same point X on the measuring area 13, the laser beam 17 strikes directly on the probe detector tip 25, and the count corresponding to the angle subtended through sweep sector B is registered. Further rotation of the periscope 14 will again go uncounted until the beam 17 strikes the third photodetector 23c and the counting for sweep sector C is initiated thereby. When the reflected beam from second mirror 19 strikes the probe detector 25 at the point X the count will be stopped and the measurement of the point X will have been completed.

As was stated in the previously mentioned axiom, only two of the angles subtended between a reference position and the point X are needed to determine the location of the point. Thus, in the present invention, one element of the data serves to provide a redundance check on the measurement.

Figure 4:
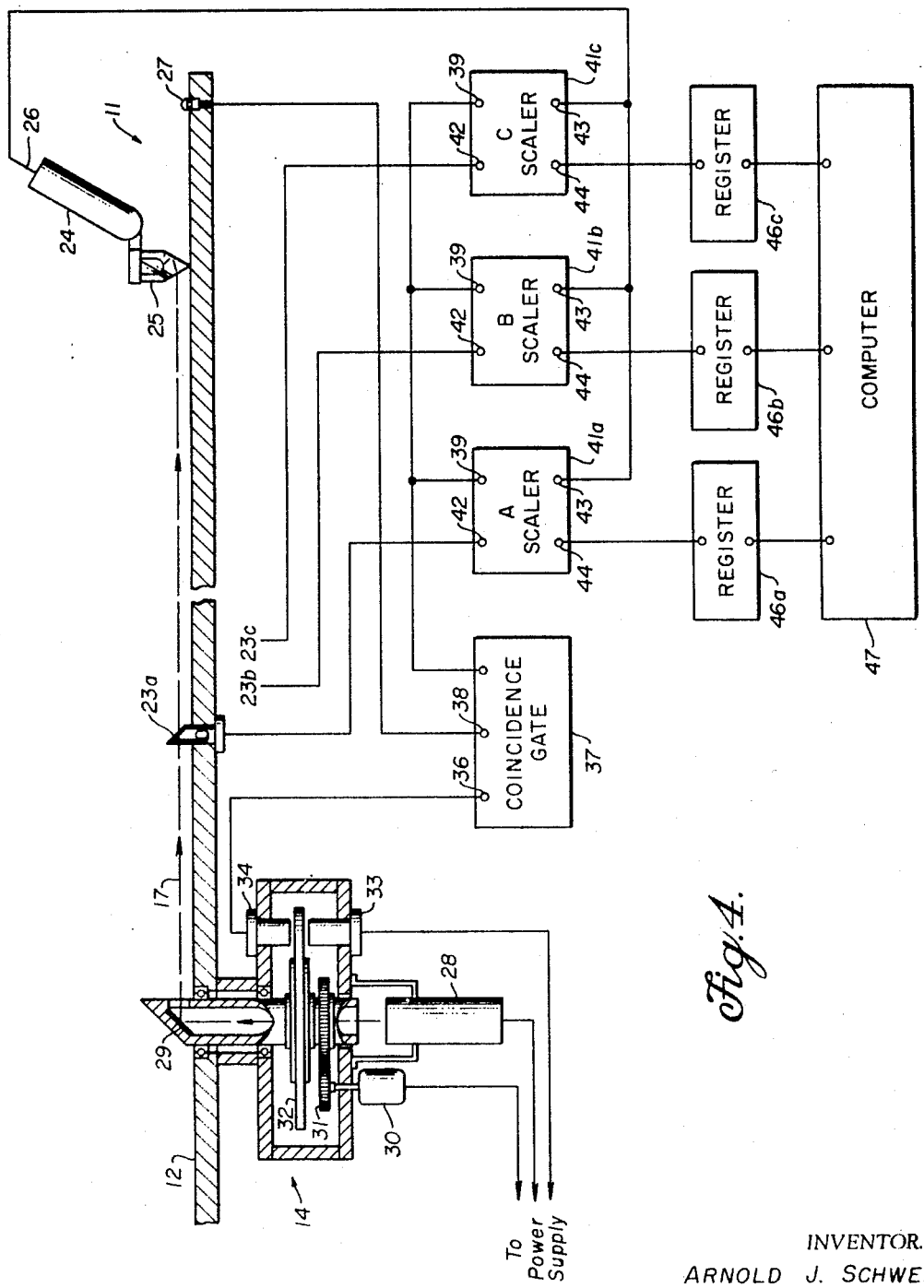
FIGURE 4 is a view taken along lines 4—4 of FIGURE 1 and showing a block diagram of the counting circuitry of the invention.

Referring now to FIGURE 4, the periscope 14 mechanism is shown mounted beneath the table top 12. The laser source 28 is disposed at the lower opening of the periscope 14 and the collimated light beam 17 therefrom is directed upward onto the periscope 45° mirror 29 to be reflected outward over the measuring table 11. Rotational drive to the periscope mirror is transmitted from a drive motor 30 by gear wheels 31.

An encoded disc 32 is concentrically mounted on the periscope 14 shaft to rotate therewith. The disc 32 may typically be of the type having a grating pattern of light transmissive slits about an annular region thereof to provide for moire fringe digitization. The commercially available Baldwin disc is an example of such a type. A light source 33, faced by a mask having an identical grating pattern is disposed beneath this region of the disc 32 to view a photocell unit 34 mounted thereabove. As the periscope 14 rotation advances the disc 32 grating past the stationary light mask grating, the light transmitted to the photocell 34 is intermittently transmitted and interrupted, whereby the advancement of each spacing of the grating pattern is indicated by an output pulse from the photocell 34, which pulses correspond to the previously mentioned rotation counts.

The output from the photocell 34 is coupled to a first input 36 of a coincidence gate 37. A gating input 38 of the coincidence circuit 37 is connected to the read button 27 on the scanning table 11, whereby the periscope 14 rotational count pulses from the photocell are transmitted only upon a command for measurement. The output of the gate 37 is branched and supplies a count input 39 to each of three scalers 41a, b and c. Each of the scalers 41 has a gating-on input 42 supplied from a respective one of the three stationary photodetectors 23 of the scanning table 11. In this way the scalers 41 are gated-on in sequence as the periscope 14 rotation sweeps the laser beam 17 into the successive origin reference angle positions of each of the sweep sectors A, B and C. The scalers 41 are gated so as to not admit the periscope rotational count signal from input 39 until the occurrence of the "start count" trigger command pulse at input 42. The "stop count" command pulse from the output 26 of the movable measuring probe 24 is applied at a gating-off input 43 of each of the scalers 41a, b and c. The output 44 of each of the scalers 41 is coupled directly to a separate one of three registers 46 which store the scaler 41 counts and thereby record angular position of the laser beam.

Thus it can be seen that as the periscope 14 begins a revolution, the beam 17 first strikes the first indexing photocell 23a of sweep sector A, whereupon scaler 41a starts a count of the disc 32 pulses from input 39. As the beam 17 sweeps further and moves onto the tip 25 of the measuring probe 24, the scaler 41 is gated-off and stops the count. The count is then transferred to the register 46a and the scaler 41a reset for a future measurement. As the beam 17 sweeps onto the second indexing photocell 23b of the scanning table, the scaler 41b counting is initiated until the arrival of the direct beam 17 at the probe 24 in sweep sector B provides a "stop count" command. The sequence is repeated in the C sector counting circuitry, whereupon the three sector count signals have all been respectively stored in the registers 46 and the measuring probe 24 may be moved to another point on the table 11 for measurement.

For the computation of the unknown point X locations, the stored counts from regiters 46 may for convenience be applied to a computer 47 which has been programmed with the dimensional constants of the system and the appropriate logic and calculation instructions. The form of the computed measurements from the computer 47 may vary according to the particular usage of the device. In the previously mentioned potential application of the invention as a master guide for automatic drafting techniques, the computed data would probably be stored and incorporated into a drafting instruction program for the computer 47. In other cases, such as certain types of map reading, the information could be available in a digitized read-out form.

The invention has been described with respect to one embodiment thereof with the circuitry and controls presented in one of several possible forms. However it should be obvious that the mirrors could be eliminated and two or more independent rotated laser beams could be utilized. That is, for instance, independent rotated laser beams could be provided at both axes 21 and 21a' of FIGURE 2a. Of course, the periscope could be eliminated and the light source itself could be rotated. Also, the three indexing photodetectors 23a, b and c could be eliminated if a differing type of encoding disc 32 is utilized wherein the obsolute angular direction of the laser beam is determinable without an indexing means. Furthermore, while the location of a point on the table may frequently be desired in X-Y coordinates therefor, it may be more convenient in many instances to utilize the angular coordinates and, of course, the various computations are not necessarily carried out in computer, it being possible, albeit tedious, for a human operator to perform the necessary calculations. It can be seen that various additional controls and accessories can be incorporated into the apparatus thereby further leading to the versatility provided by the novel measuring technique.

Accordingly, while the invention has been described with respect to a particular embodiment thereof, it will be apparent to those skilled in the art that numerous variations and modifications are possible within the spirit and scope of the invention.

What is claimed is:
1. In apparatus for determining the position of points on a planar measuring surface the combination comprising:
 (a) a source of light,
 (b) means for sweeping a beam of light from said source in a first arcuate path in a plane parallel to said surface during a first time interval,
 (c) means for measuring the angular position of said sweeping means,
 (d) a light sensor disposable at any one of a plurality of positions in said plane in said beam path and within range of light from said source,
 (e) recording means coupled to said measuring means and said light sensor for recording the angular position of said sweeping means at which said light in said first arcuate path is detected by said sensor, and
 (f) a reflector spaced away from said light source for redirecting said beam of light from said source in a second arcuate path in said plane during a second time interval separate from said first interval for activating said light sensor and said measuring means for recording the angular position of said sweeping means at which said light in said second arcuate path is detected by said sensor.

2. The combination of claim 1 wherein said reflector is a flat mirror mounted stationary with respect to said measuring surface and normal with respect to said measuring surface.

3. The combination of claim 1 wherein said light source is stationary with respect to said measuring surface and located out of said plane, and wherein said sweeping means includes a rotatable periscope for conducting a beam of light from said source to said plane.

4. Apparatus as described in claim 1 wherein said light source is a laser.

5. The combination of claim 1 wherein said measuring means includes a first light detector stationary with respect to said measuring surface for detecting the beginning of the sweep of said beam through said first arcuate path, and a second light detector stationary with respect to said measuring surface for detecting the beginning of the sweep of said beam through said second arcuate path.

References Cited
UNITED STATES PATENTS

| | | |
|---|---|---|
| 2,895,053 | 7/1959 | Frank et al. |
| 3,072,798 | 1/1963 | Sick _____ 250—236 X |
| 3,184,847 | 5/1965 | Rosen. |
| 3,366,794 | 1/1968 | Alvarez. |
| 3,365,799 | 1/1968 | Fisher. |

WILLIAM D. MARTIN, Jr., Primary Examiner

U.S. Cl. X.R.

33—46; 250—236